Patented Nov. 27, 1951

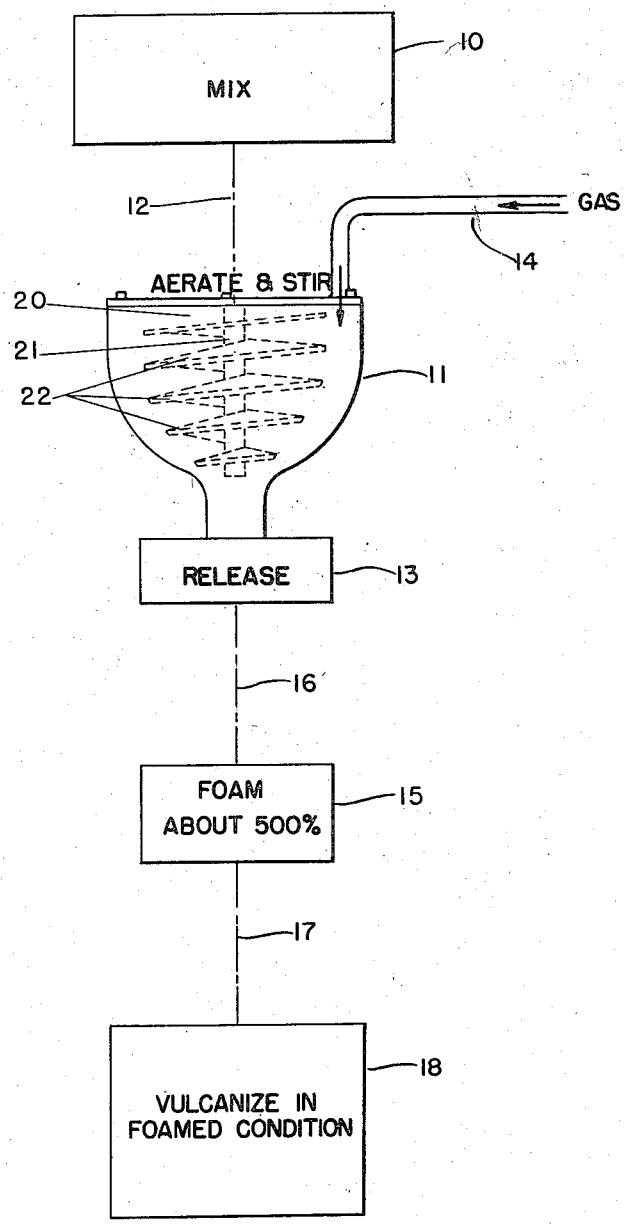

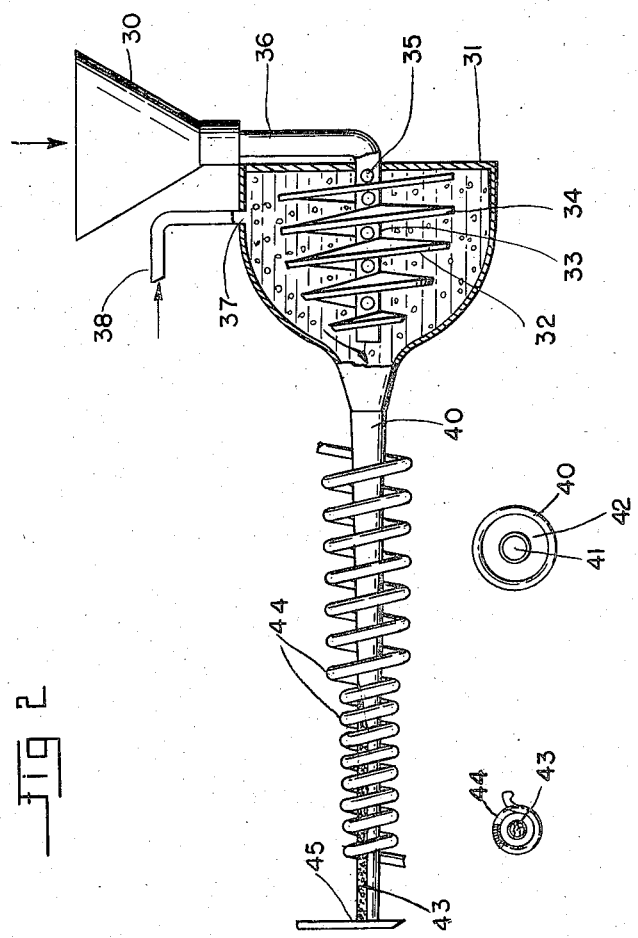

2,576,318

UNITED STATES PATENT OFFICE 2,576,318

METHOD OF MAKING FOAM RUBBER

Harry A. Toulmin, Jr., Dayton, Ohio, assignor to The Commonwealth Engineering Company of Ohio, Dayton, Ohio, a corporation of Ohio Application September 19, 1949, Serial No. 116,537

3 Claims. (Cl. 260—723)

This invention relates to rubber products. More particularly it relates to sponge rubber. Still more particularly it relates to sponge rubber products of controlled density and to a method for continuously producing the same.

In the past, foam rubber products have been prepared by incorporating suitable gas into a rubber dispersion and vulcanizing the foam products in molds. The nature of such procedures makes batchwise operations a necessity.

This process is a high unit cost operation because of the number of expensive molds which are necessary and the length of time each mold must be tied up to vulcanize any appreciable thickness of foam product.

It is an object of the present invention to overcome the disadvantages and limitations of the processes known heretofore.

It is another object of the present invention to provide a continuous method of forming shaped objects.

It is a still further object of this invention to provide a method of continuously discharging a rubber dispersion from a tank in foaming condition.

It is still another object of this invention to provide a process wherein continuously discharged dispersion forms a foam of controlled and uniform density.

It is a further object of the present invention to provide an inexpensive method of continuously aerating, shaping, curing and cutting sponge rubber.

It is another object of this invention to provide an inexpensive method of forming sponge rubber objects such as gaskets and the like.

In brief, the process consists of compounding a rubber dispersion which forms a foam stable under curing conditions; continuously mixing the dispersion with aerating gases in a closed chamber which is equipped with auger type mixing equipment, and continuously discharging the same therefrom.

This auger type mixer not only mixes the gas and dispersion, but also directs the aerated mixture to the point where it is discharged to a coagulation zone. The stable foam formed is vulcanized in this condition to a spongy cellular mass.

In this process natural as well as synthetic rubbers or their mixtures are applicable. Thus, the term dispersion is to be understood to mean any dispersion of a rubber and rubber-like substance, including synthetic, reclaim, partially prevulcanized and natural rubbers in a colloidal suspension form.

Neoprene, butadiene, polymers, as for example, butadiene-styrene, butadiene acrylonitrile polymers, polyvinyl chloride, and other equivalent latices have been found especially satisfactory.

It is essential to the instant invention that the foams quickly attain stability in order that they may be cured while standing in air.

One method of obtaining stability in the foams is the use of a delayed action coagulant. These delayed action coagulants or gelling agents are, for example polyvinyl methyl ether, sodium silico fluoride, ammonium sulfate, and equivalent salts of weak bases and strong acids.

The dispersions may be compounded with stabilizers, the above mentioned gelling agents, activators or accelerators, latex thickeners, and the like.

Following compounding the dispersion may be foamed by the incorporation of gases at atmospheric pressures or at higher pressures, such as carbon dioxide, nitrous oxide, propane, and equivalent gases.

A wide variation in solubility of gases and the pressures under which the gases are used makes generalizations concerning these gases have little meaning. However, with gases, such as nitrous oxide, charging has been carried out under pressures ranging from 20 to 500 lbs. per square inch.

Under the influence of gases, dispersions of rubber have been expanded to have a wide range of densities, ranging from 0.1, which is a highly expanded foam, to .8 or .9, which is a relatively dense foam.

It will at once be recognized that the rubbery material surrounding each gas pocket will be in a highly attenuated state and imparts soft yielding characteristics.

A gelling agent such as sodium silico fluoride is added to these rubber dispersions in quantities ranging from .5 to 5% by weight of the dry solids in the dispersion, with the preferred amount being about 1%.

By adjustment of the pH of the dispersion, gelation may be caused to occur over a period of from 30 seconds to 30 minutes. In general, for the purposes of this invention, it is preferred that the expanded foams gel in a period ranging from 3 to 7 minutes.

When it is preferred that the dispersions be at a pH approximately neutral at the time of foaming, stabilizers may be added to prevent coagulation before the dispersion is foamed.

Compounds such as polyethylene glycol oleyl ether may be added for this purpose in quantities ranging from approximately ½ part per 100 parts of dispersion to 5 parts per 100 parts of dispersion. The amount is determined not only by the pH of the latex composition, but also the type of solids content, gelling agent, and like variables. Other useful stabilizers which may be utilized in quantities ranging from 0.2 to 2 parts per 100 parts of dispersion are ammonium caseinate and potassium castor oil soap.

Inasmuch as the foams are to be vulcanized, numerous agents may be intimately mixed into the dispersion, preferably activators or accelerators for the curing operation, such as zinc diethyl dithio carbamate, zinc salt of 2 mercaptobenzothiazole, and equivalent polyvalent metal products.

Another agent in common use is zinc oxide. Zinc oxide is a mild gelling agent when used in conjunction with an acid gelling agent as well as a curing activator.

The action of the above described reagents is in no way hampered by addition of foam stability agents, as for example, the soaps.

Latex thickeners may also be employed for increasing the foam stability. An example of a latex thickener is a 5% solution of methyl cellulose.

The temperature of vulcanization depends upon the type of rubber, its accelerators, and so forth. The time for vulcanization likewise varies.

The problem involved in its solution is well known in the rubber industry and needs no description here, except that an oven temperature of from 200 to 250° F. has been found satisfactory.

The length of time for heat treatment varies greatly depending upon such factors as thickness of the foam and the like.

The invention will be more fully understood from the following description taken in connection with the accompanying drawings in which:

Figure 1 is a flow sheet; and

Figure 2 shows an apparatus embodying the invention in elevational view with the front mixing chamber wall cut away to show the auger type mixer.

Referring to Figure 1 there is represented a mixing station 10. Compounded rubber dispersion prepared at this station moves to the aeration station 11 through 12.

Aeration station 11 is a closed chamber within which is rotated an auger type mixer 20. Auger 20 consists of a shaft 21 driven from a source of power, not shown, upon which are mounted transverse arm units 22 which may consist of flights, helical vanes, and the like, of reducing radius as the outlet or release zone 13 is approached.

Gas is fed to station 11 through conduit 14 and is stirred into a rubber dispersion therein.

Released aerated rubber dispersion moves to a foaming or expansion station 15 through conduit 16. From the foaming station 15, the stable foam expanded to about 500% in volume (a density of about 0.1) is conducted by suitable means indicated at 17, which may take the form of a belt or conduit or equivalent means, to a vulcanizing station 18 where the foam is cured to a permanent sponge.

Referring to Figure 2 for an adaptation of the invention wherein a method is provided for the continuous production of sponge rubber gaskets, the apparatus consists of a hopper 30 through which a compounded rubber dispersion is moved to an aerating chamber 31.

Chamber 31 is provided with a mixer unit 32. Mixer unit 32 is composed of a horizontally disposed shaft 33 having a transversely disposed helical vane 34 of continuously reducing radius mounted thereon. Shaft 33 is mounted for rotation and adapted to be driven by a source of power not shown. Shaft 33 is hollow and provided with ports 35. An outlet conduit 36 of hopper 30 is connected to said shaft 33 through a suitable rotary seal.

A gas inlet 37 is also connected with a conduit 38 for introduction of gas into the chamber 31.

In axial alignment with the shaft 33 there is provided an outlet for chamber 31. This outlet is provided with a connecting frustro-conical conduit 40. Axially mounted within conduit 40 is a tubular rod 41 defining the shape of an annular chamber 42.

Conduit 40 terminates in a trough section 43. Conduit 40 and its trough section 43 are adapted with suitable heating means 44, such as helical steam heating coils, radiant heaters, or the like.

Adjacent the terminus of the trough section 43 there is positioned suitable segmenting means 45, such as for example, a high speed saw.

Operation of the gasket making equipment is as follows: a compounded rubber dispersion is flowed into hopper 30. The dispersion flows through conduit 36 and the shaft 33, and issues into the interior of the chamber 31 through ports 35.

The helical stirrer thoroughly mixes the rubber dispersion with air entering through conduit 38. The helix 34 drives the aerated dispersion into the conduit 40 where it is pushed along continuously as an annular shaped rubber tube.

As it passes through the conduit 40 the rubber is cured by subjecting it initially to heat of about 200° F., followed by final curing at a temperature of about 250° F.

The cured sponge rubber tube supported in trough section 43 of conduit 40 is cut into the circular gaskets of suitable thickness.

The following are two illustrative formulations which may be utilized to form gaskets:

Example I

A master mix may be compounded in the following proportions from an aqueous dispersion of natural latex:

| | Parts |
|---|---|
| Natural latex (63.4% solids) | 237.0 |
| 20 per cent ammonia oleate emulsion | 15.0 |
| 50 per cent Sunoco's circo oil emulsion | 9.0 |
| 15 per cent ammonia caseinate solution | 2.5 |
| 73 per cent sulfur dispersion | 4.1 |
| 55 per cent di-beta-naphthyl-para-phenylene diamine dispersion | 2.8 |
| 55 per cent zinc diethyl-dithiocarbamate dispersion | 2.8 |
| 55 per cent zinc salt of 2 mercaptobenzothiazole dispersion | 2.8 |

With the mixture at room temperature, the following ingredients may be added with good agitation in the order and quantities specified:

| | Parts |
|---|---|
| 50 per cent zinc oxide dispersion | 9.0 |
| 40 per cent Fleischman's yeast solution | 6.0 |
| 25 per cent sodium silico fluoride solution | 12.0 |
| 130 volume hydrogen peroxide solution | 15.0 |

From each approximately 300 parts of solution-dispersion, approximately 1700 cc. of foam may be obtained.

Example II

A dispersion of a synthetic rubber latex, namely, butadiene-styrene polymer, having approximately 60% total solids, may be utilized as for mixing of Example I, and mixed into a heat sensitive latex dispersion by compounding as follows:

| | Parts |
|---|---|
| Butadiene-styrene polymer GRS 7 | 230 |
| Polyvinyl methyl ether | 4 |
| Ammonia oleate emulsion | 8 |
| Sulfuric acid | 5 |
| 35 per cent solution potassium castor oil soap | 8 |
| Zinc oxide | 5 |
| Clay | 10 |
| Sulfur | 3 |
| Sodium silico fluoride | 12 |
| Zinz salt of 2-mercaptobenzothiazole 55% dispersion | 1½ |

When the mixture is at a temperature approximately 55° F., nitrous oxide gas under a pressure may be introduced.

This mixture will produce approximately 900 cc. of foam for each 200 grams of dispersion, which is stable and does not lose appreciable volume while being cured.

Conditions in the equipment may be as follows:

| | |
|---|---|
| Flow rate of dispersion lb. min | 1 |
| Pressure of gas lbs. per sq. in | 200 |
| Temperature of initial vulcanizing ° F | 180 to 225 |
| Temperature of final vulcanizing ° F | 225 to 280 |
| Speed of rotation of helical mixer R. P. M | 2200 |

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. In the process for continuously producing sponge rubber products the steps comprising continuously introducing an aqueous compounded rubber dispersion having small amounts of polyvinyl methyl ether and ammonium caseinate therein at a pH of approximately 7 into a closed chamber, incorporating gaseous medium into the dispersion to produce an aerated product, continuously displacing the aerated product as formed axially of the chamber to an opening therein to gel said product and through an annular cross section shaping and curing zone, said annular cross section being progressively reduced to compensate for predetermined shrinkage.

2. In a process for continuously producing sponge rubber the steps comprising continuously introducing an aqueous compounded rubber dispersion having small amounts of polyvinyl methyl ether and ammonium caseinate therein at a pH of approximately 7 into a closed chamber, incorporating nitrous oxide at a pressure of between about 20 to 500 pounds per square inch into the dispersion to produce an aerated product, continuously displacing the aerated product as formed axially of the chamber to an opening therein to gel said product and through an annular cross section shaping and curing zone, said annular cross section being progressively reduced to compensate for shrinkage of said product as it passes through said zone.

3. In a process for continuously producing sponge rubber the steps comprising continuously introducing an aqueous compounded rubber dispersion having small amounts of polyvinyl methyl ether and ammonium caseinate therein at a pH of approximately 7 into a closed chamber at a flow rate of approximately one pound per minute, incorporating nitrous oxide at a pressure of about 200 pounds per square inch into the dispersion to produce an aerated product, continuously displacing the aerated product as formed axially of the chamber to an opening therein to gel said product and through an annular cross section shaping and curing zone having a temperature of between about 180 to 225 degrees Fahrenheit, said annular cross section being progressively reduced to compensate for shrinkage of said product as it passes through said zone.

HARRY A. TOULMIN, Jr.

REFERENCES CITED

The following references are of record in the file of this patent:

UNITED STATES PATENTS

| Number | Name | Date |
|---|---|---|
| 2,039,191 | Schidrowitz et al. | Apr. 28, 1936 |
| 2,114,275 | Murphy et al. | Apr. 12, 1938 |
| 2,208,536 | Brown | July 16, 1940 |
| 2,244,616 | Greenup et al. | June 3, 1941 |
| 2,261,847 | Dufour et al. | Nov. 4, 1941 |
| 2,295,740 | Keen | Sept. 15, 1942 |
| 2,324,988 | Greenup et al. | July 20, 1943 |
| 2,376,281 | Schott et al. | May 15, 1945 |
| 2,475,191 | Marvin et al. | July 5, 1949 |